(12) United States Patent
Rhinerson et al.

(10) Patent No.: US 9,919,828 B2
(45) Date of Patent: Mar. 20, 2018

(54) BALLOON ANCHOR

(71) Applicants: Karen Anne Rhinerson, Wheaton, IL (US); Lori Diane Kennedy, West Chicago, IL (US)

(72) Inventors: Karen Anne Rhinerson, Wheaton, IL (US); Lori Diane Kennedy, West Chicago, IL (US)

( * ) Notice: Subject to any disclaimer, the term of this patent is extended or adjusted under 35 U.S.C. 154(b) by 0 days.

(21) Appl. No.: 14/811,822

(22) Filed: Jul. 28, 2015

(65) Prior Publication Data

US 2016/0031585 A1 Feb. 4, 2016

Related U.S. Application Data

(60) Provisional application No. 62/030,499, filed on Jul. 29, 2014.

(51) Int. Cl.
*B65D 1/34* (2006.01)
*A63H 27/10* (2006.01)
*F16B 47/00* (2006.01)

(52) U.S. Cl.
CPC ............... *B65D 1/34* (2013.01); *A63H 27/10* (2013.01); *A63H 2027/1008* (2013.01); *F16B 47/00* (2013.01)

(58) Field of Classification Search
CPC .. B65D 1/34; A63H 27/10; A63H 2027/1008; F16B 47/00
USPC ......... 248/499, 910, 205.5, 206.2, 362, 504, 248/363; 446/220, 222
See application file for complete search history.

(56) References Cited

U.S. PATENT DOCUMENTS

| | | | |
|---|---|---|---|
| 354,416 A | 12/1886 | Heisey | |
| 1,736,122 A | 11/1929 | La Duke | |
| 3,250,241 A | 5/1966 | Milton | |
| 3,941,384 A | 3/1976 | Wopschall | |
| 4,102,081 A | 7/1978 | Morrow | |
| 4,635,394 A | 1/1987 | Brown | |
| 4,813,641 A * | 3/1989 | Wilson .................... D06F 58/04 | |
| | | | 248/206.2 |
| 4,846,429 A * | 7/1989 | Scheurer ................. F16B 47/00 | |
| | | | 248/205.8 |
| 4,936,532 A | 6/1990 | Williams | |
| D316,499 S | 4/1991 | Coffey | |
| 5,004,633 A * | 4/1991 | Lovik .................... A63H 27/10 | |
| | | | 244/31 |
| 5,011,447 A | 4/1991 | Watanabe | |
| 5,016,848 A * | 5/1991 | Metz ...................... A63H 27/10 | |
| | | | 248/176.1 |
| 5,035,391 A | 7/1991 | Steele | |
| 5,074,510 A * | 12/1991 | Metz ...................... A63H 27/10 | |
| | | | 248/121 |
| 5,743,044 A | 4/1998 | Hopkins | |
| 5,938,154 A | 8/1999 | Bartels | |
| 6,076,758 A | 6/2000 | Kieves | |
| 6,358,110 B1 * | 3/2002 | Apsner .................. A63H 27/10 | |
| | | | 446/220 |

(Continued)

*Primary Examiner* — Anita M King
(74) *Attorney, Agent, or Firm* — Erickson Law Group, PC (57) ABSTRACT

A balloon anchor and a table top centerpiece for anchoring a balloon filled with a substance that is lighter than the surrounding ambient air is disclosed. The centerpiece has a bottom wall and one or more sidewalls. The centerpiece provides a fill material receiving space for receiving decorative fill material below the rim. The bottom wall has a balloon anchor member.

18 Claims, 7 Drawing Sheets

(56) References Cited

U.S. PATENT DOCUMENTS

| | | |
|---|---|---|
| 6,422,914 B1 | 7/2002 | Nelson |
| 6,523,798 B1 | 2/2003 | Novak |
| 6,663,460 B1 | 12/2003 | Nelson |
| 6,877,704 B2 | 4/2005 | Novak |
| 7,059,082 B2 | 6/2006 | Barlow |
| D634,792 S * | 3/2011 | Goodman-Pollack ....... D21/453 |
| 8,152,588 B2 | 4/2012 | Hua |
| 8,668,949 B2 | 3/2014 | Wilson et al. |
| 9,089,784 B2 * | 7/2015 | Nelson ................... A63H 27/10 |
| 2006/0053688 A1 | 3/2006 | Barlow |
| 2008/0085655 A1 | 4/2008 | Boise |
| 2013/0237121 A1 | 9/2013 | Nelson |

* cited by examiner

BALLOON ANCHOR

This application claims the benefit of U.S. Provisional Application 62/030,499 filed on Jul. 29, 2014, which is herein incorporated by reference.

FIELD OF THE INVENTION

This invention relates in general to devices for anchoring balloons.

BACKGROUND OF THE INVENTION

Centerpieces are known to be used on table tops to provide table decoration. Centerpieces may also provide functional features such as the ability to hold items. U.S. Pat. No. D121,119 discloses one type of a centerpiece.

It is also known that balloons that are filled with a substance, such as helium, which is lighter than the surrounding ambient air, must be restrained in some fashion otherwise the balloon will escape upwards under influence of the helium. U.S. Pat. No. 5,035,391 discloses a balloon anchor in the form of a weight that can be placed on a desk or table to restrain a balloon that is connected to the weight by a tether.

The present inventors recognized the need to eliminate the use of bulky weights, such as disclosed in U.S. Pat. No. 5,035,391, for anchoring balloons in or adjacent to centerpieces or other decorative containers. The present inventors recognized the need to provide a balloon anchor that is more compact and does not require the extra space occupied by weighted anchors.

The present inventors recognized the need for a table centerpiece that provides a device for holding balloons from a central location of the centerpiece. The present inventors recognized the need for a balloon anchor that could be covered and concealed within a centerpiece, by decorative, edible, or otherwise useful fill materials, so that the balloon anchor is not visible. The present inventors recognized the need for a combined centerpiece and balloon anchor. The present inventors recognized the need for a balloon anchor that could be used with existing containers and centerpieces. The present inventors recognized the need for a balloon anchor that is releasably attachable to a centerpiece.

SUMMARY OF THE INVENTION

A table top centerpiece for anchoring a balloon filled with a substance that is lighter than the surrounding ambient air is disclosed. The centerpiece has a bottom wall and a curved sidewall. The curved sidewall extends from the bottom wall and surrounds the bottom wall to form a bowl. The bowl provides a semi-enclosed space with an open top opposite the bottom wall. The curved sidewall forms a rim opposite the bottom wall. The bowl provides a fill material receiving space for receiving decorative fill material below the rim.

The bottom wall comprises a balloon anchor member. The balloon anchor member has a height that is less than the height of the sidewall. The balloon anchor member forms a balloon string opening configured to allow a portion of a balloon string to pass through the balloon string opening and be secured about the balloon anchor member.

In some embodiments, the anchor member is an arch attached to the bottom wall. In some embodiments, the anchor member is a loop attached to the bottom wall.

In some embodiments, the anchor member is removably attached to the bottom wall by a suction cup. In some embodiments, the anchor member comprises an adhesive that joins the anchor member to the bottom wall.

In some embodiments, the anchor member is centered on the bottom wall in all directions from the sidewall.

A balloon anchor is disclosed. The balloon anchor has one or more perimeter walls, a balloon string passage, and an attachment device. The balloon string passage is provided interior to the one or more perimeter walls. The balloon string passage has an entrance and an exit. The attachment device is attached to an exterior side of the one or more perimeter walls for joining with an interior wall of a table top centerpiece.

A method of creating a decorative centerpiece for a table top is disclosed. A first end of a balloon string is attached to a balloon anchor of a centerpiece by threading the first end of the string through a balloon string opening of the balloon anchor. Then the first end of the balloon string is attached to a second portion of the balloon string that was not put through the balloon string opening to form a loop around the balloon anchor with the balloon string. A second end of the balloon string is attached to a balloon filled with a substance that is lighter than the surrounding ambient air. The balloon anchor is attached to an interior bottom wall of a centerpiece and has a height that is less than a height of a sidewall of the centerpiece. The centerpiece is filled with fill material at least until the balloon anchor is covered with fill material.

In some embodiments, the balloon anchor is attached to an interior bottom wall of a centerpiece before the string is attached to the balloon anchor.

In some embodiments, an attachment side of a suction cup attached to the balloon anchor is pressed against the surface of the interior bottom wall of the centerpiece to removably attach the balloon anchor to the centerpiece.

In some embodiments, the fill material is selected from the group consisting of: water, rocks, sand, sea shells, food, vegetation, live fish, paper, figures, figurines, and candles.

Numerous other advantages and features of the present invention will become readily apparent from the following detailed description of the invention and the embodiments thereof, from the claims, and from the accompanying drawings.

DETAILED DESCRIPTION

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
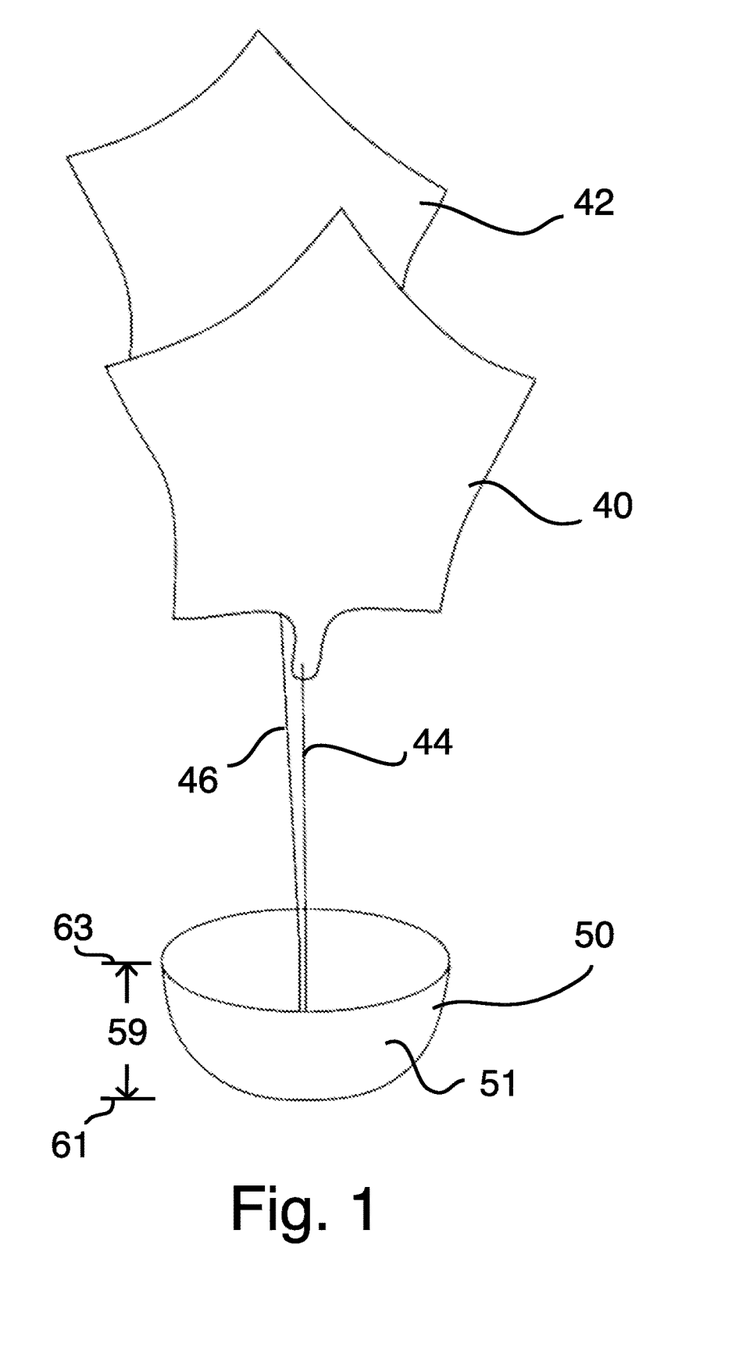
FIG. 1 is a front perspective view of a balloon anchor bowl of the invention connected to two balloons.
Figure 2:
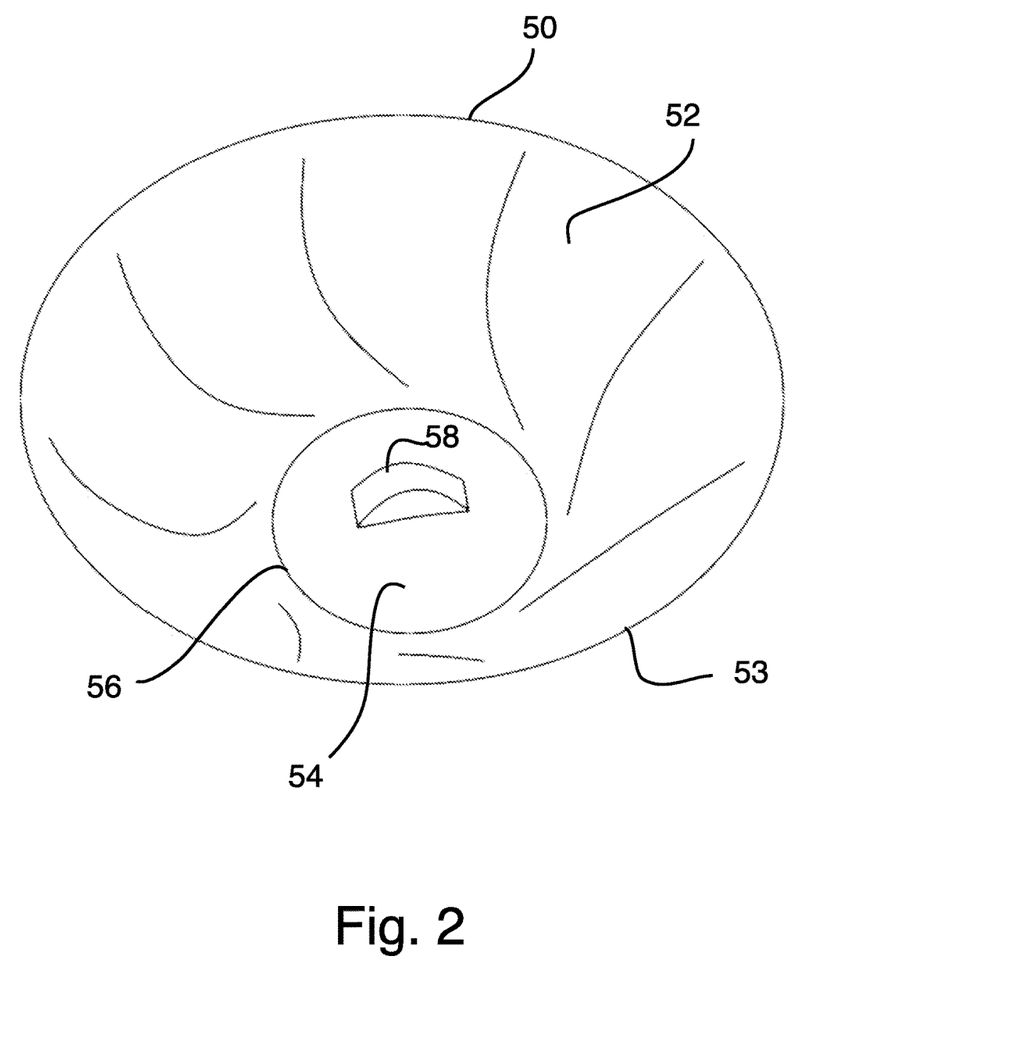
FIG. 2 is a top perspective view of the balloon anchor bowl of FIG. 1.

FIGS. 1 and 2 show one embodiment of a balloon anchor bowl 50 of the invention. The bowl comprises an exterior sidewall 51, an interior sidewall 52, a bottom wall 54, and a balloon anchor loop 58 attached to the bottom wall. In some embodiments, the bowl has a flat bottom 54 that joins at a junction 56 with the sidewall 52. The sidewall 52 has a curve. The top of the sidewall comprises a rim 53.

Figure 3:
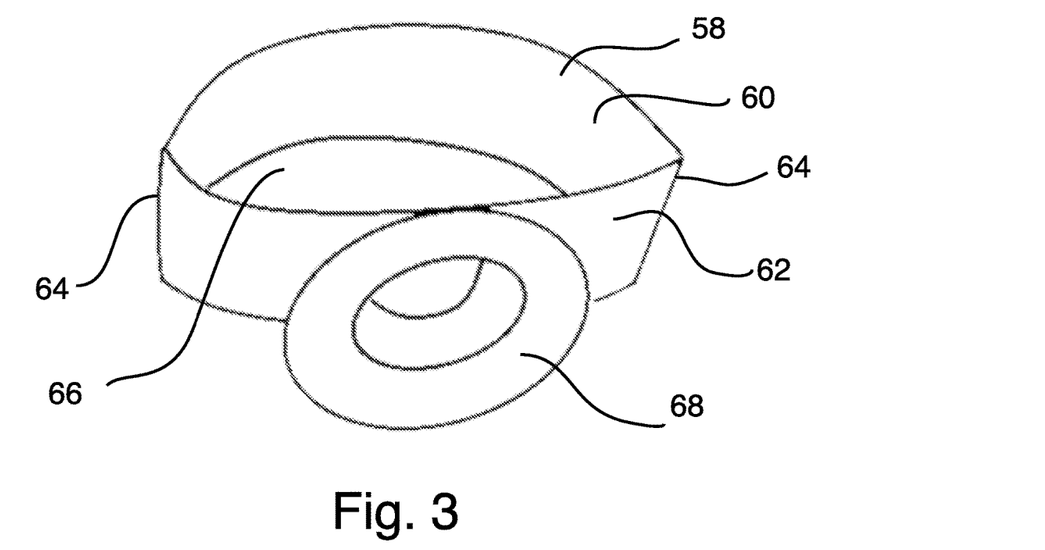
FIG. 3 is a front perspective view of a balloon anchor loop from FIG. 2.

In some embodiments, the anchor loop 58 comprises an arching upper portion 60 and a lower portion 62 as shown in FIG. 3. The upper portion 60 joins with the lower portion 62 at connecting seams 64. In some embodiments, the lower portion 62 arches in a direction opposite of the arch of the upper portion 60. In some embodiments, the lower portion is flat. In some embodiments, the anchor loop 58 is a continuous circular loop without connecting seams. In some embodiments, the anchor loop is an ellipse. In some embodiments, the anchor loop is a square, rectangle, quadrilateral, triangle, or irregular shape.

In some embodiments, the anchor loop is centered in all directions on the bottom wall 54 from the junction 56 and/or the sidewalls 52.

The anchor loop 58 comprises a central passage or opening 66 that extends through the interior of the loop from a first side to an opposite second side and between the upper portion and lower portion.

FIG. 3 shows a suction cup 68 attached to the lower portion 62 of the anchor loop 58. The suction cup allows the anchor loop to be removably attached to the bottom wall 54 of the bowl 50.

Figure 4:
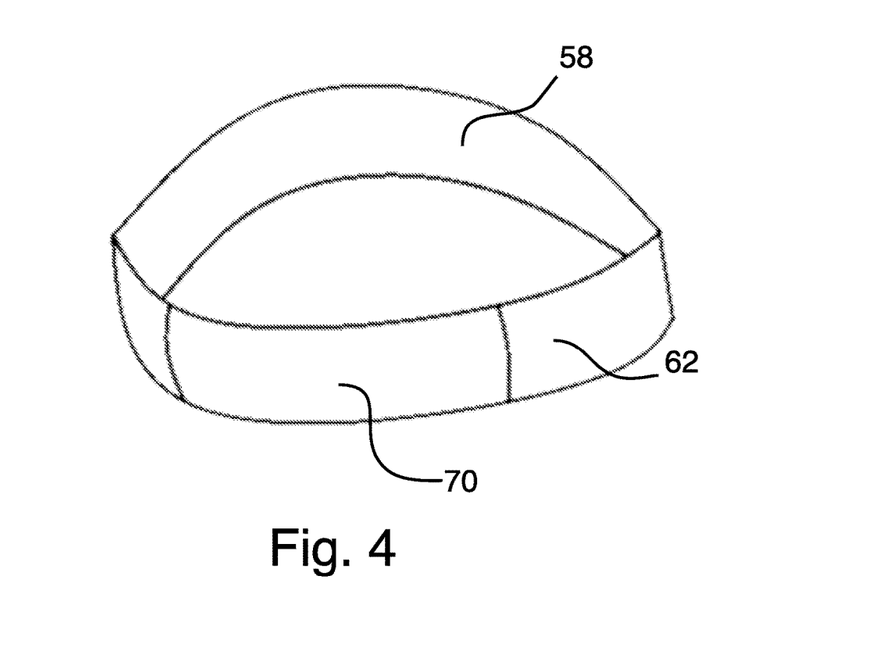
FIG. 4 is a front perspective view of a second embodiment balloon anchor loop.

FIG. 4 shows a second embodiment balloon anchor loop 58 comprising an adhesive strip 70 provided on the lower portion 62 of the anchor loop 58. The adhesive strip comprises an adhesive, such as glue. The adhesive joins the loop 58 to a surface which the adhesive strip comes in contact with.

In some embodiments, the loop 58 is integrally formed with the bottom wall 54 of the bowl.

In some embodiments, the bottom wall 54 of the bowl acts as the lower portion 62, so that the bottom portion is not needed and the upper portion 60 attaches directly to the bottom wall 54 to from the loop there between.

In some embodiments, the sidewall height 59 of the sidewall 52 between the bottom wall 54 and the rim 53 is greater than the height of the loop 58. In some embodiments, the sidewall is from two to twenty times the height of the loop 58 when attached to the bottom wall 54. The interval from two to twenty is mathematically inclusive of the endpoints of the interval. The height of the sidewall is greater when measured along a plane that is perpendicular to the plane 61 of the surface of the bottom wall 54 and extends between the bottom wall and a rim plane 63 defined by the top surface of the rim. Also, the distance along the curved sidewall between the bottom wall and the rim is longer than the vertical height of the loop 58 from the loops attachment to the bottom wall 54 to its highest surface.

The bowl 50 can act as a table centerpiece. One or more balloons 40, 42 can be attached to the anchor loop 58 of the bowl by strings 44, 46. The balloon may be filled with helium or another substance that is lighter than the surrounding ambient air. Therefore the balloon will float upward in ambient air when not otherwise restrained or anchored.

Figure 5:
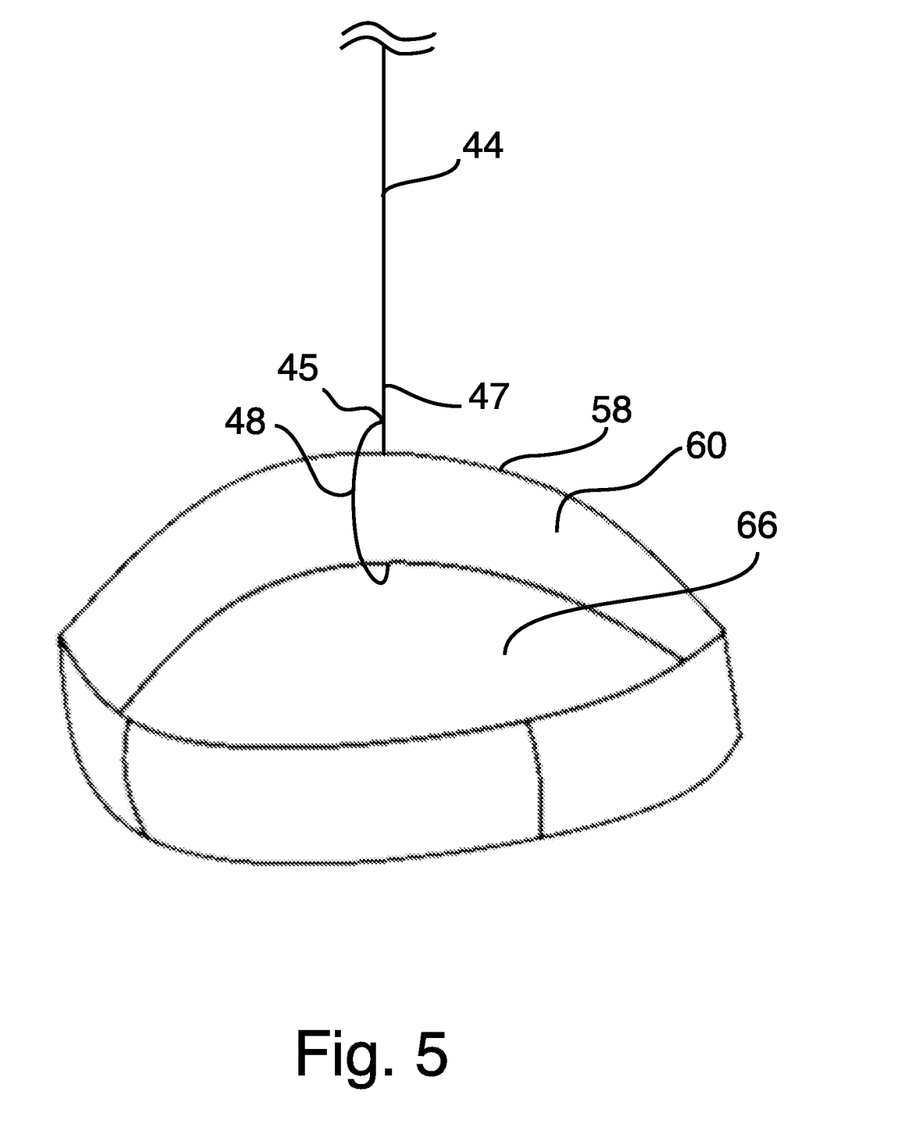
FIG. 5 is a front perspective view of the balloon anchor loop of FIG. 4.

As shown in FIG. 5, the string 44 can be attached at one end to the balloon 40 and attached at the opposite end to the anchor loop. A first end 45 of the string can be feed into and through the opening 66 of the loop. Then the first end 45 can be tied onto a second portion 47 of the string from the other side of the loop 58 (that was not fed through) to form a string loop 48 around the upper portion 60 of the anchor loop 58.

After as many balloons as desired are secured to the loop, fill material can be added to the bowl so that the interior of the bowl is filled or partially filled. In one method, the fill material is added until the balloon anchor is covered with fill material. When the interior of the bowl is filled, the loop 58 is covered by the fill material. Fill material can be added until the bowl is full so that the fill material reaches the rim. In some cases the fill material can be overfilled so that there is at least a portion of the fill material that extends above the rim.

Various different types of fill material can be used in the same bowl to create the desired utility, visual, aesthetic, and/or artistic effect. In some embodiments, the bowl completely or partially comprises a transparent or translucent sidewall and/or bottom wall so as to allow viewing of the contents (fill material) through the sidewall of the bowl or to allow light to pass through the sidewall, respectively. The fill material may comprise: water, rocks, aggregate, sand, sea shells, food, candy, flowers, vegetation, live fish, paper, figures, plastic shapes, candles, figurines, ribbons, and/or a combination of one or more of the foregoing. In some embodiments, the anchor loop is completely or partially transparent or translucent.

Figure 6:
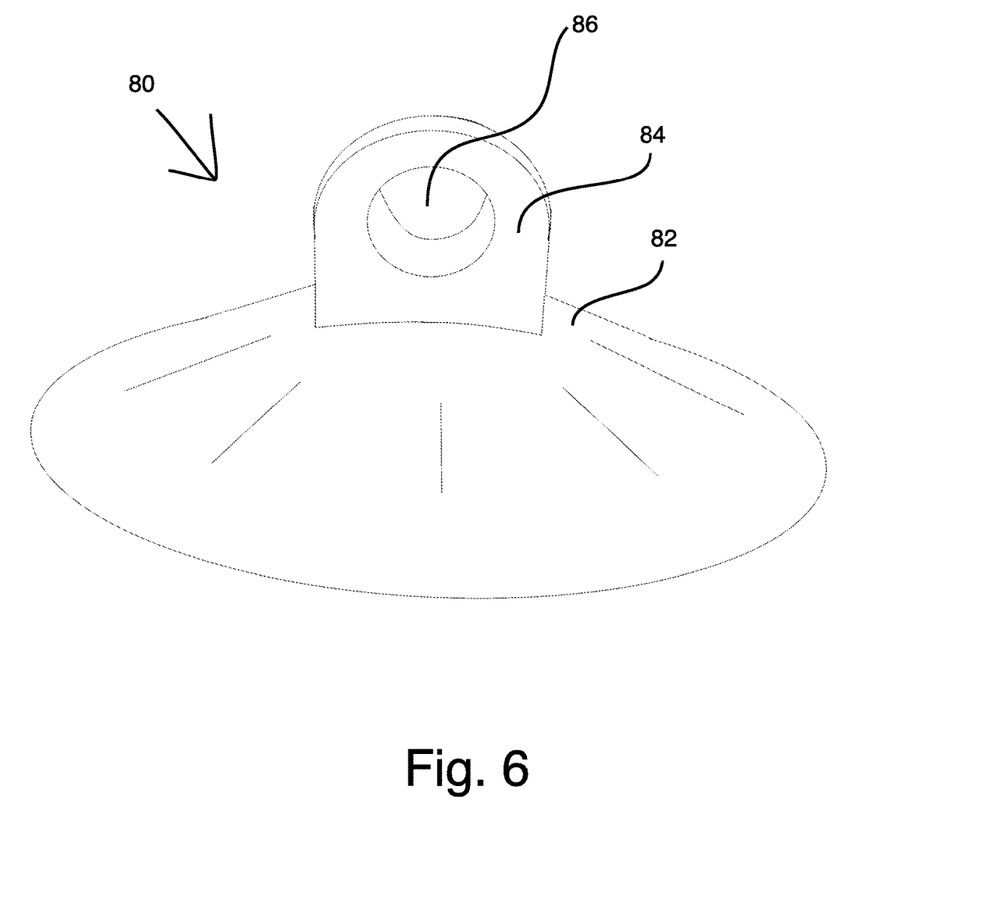
FIG. 6 is a perspective front view of a third embodiment balloon anchor loop.
Figure 7:
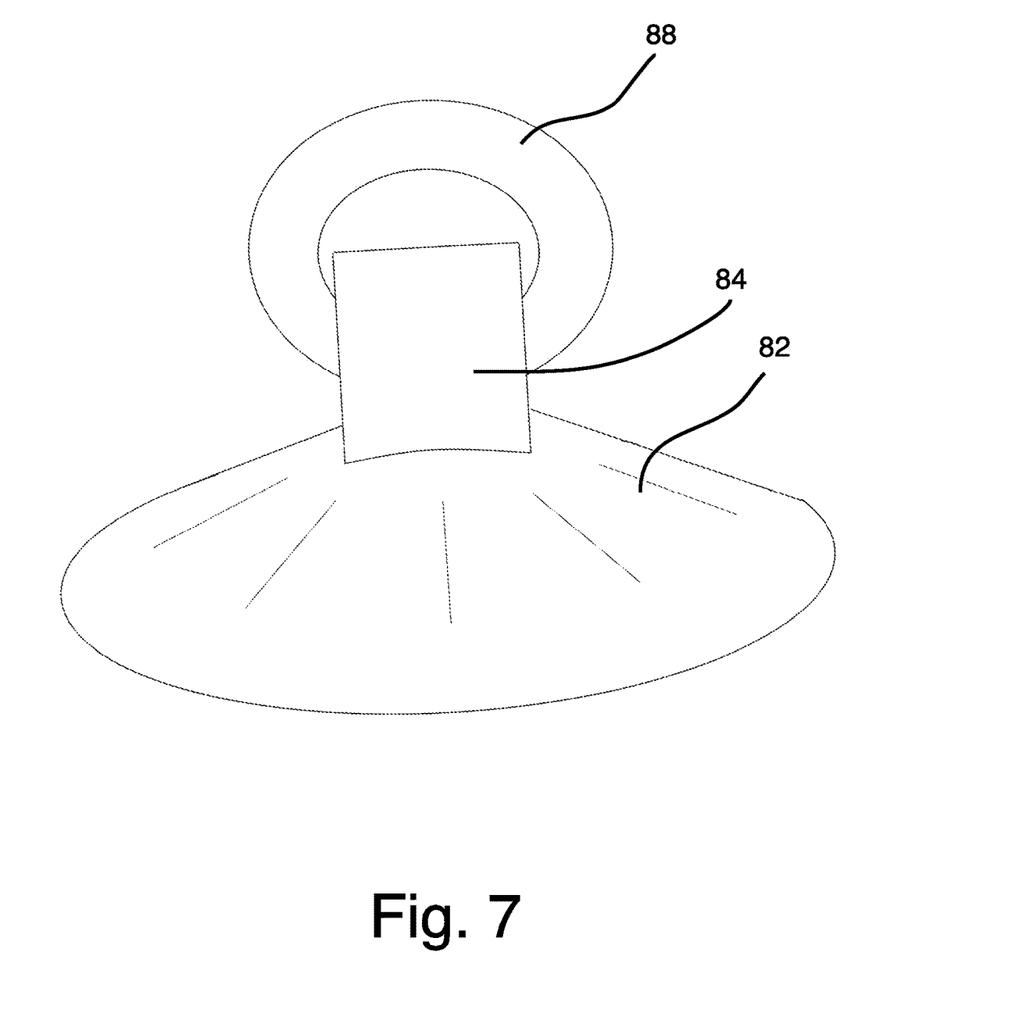
FIG. 7 is a perspective side view of the balloon anchor loop of FIG. 6.

A third embodiment balloon anchor loop 80 is shown in FIGS. 6 and 7. The loop 80 comprises a suction cup 82, and a mount 84 with an aperture 86. A ring 88 is provided extending through the aperture 86. The string 44 can be attached to the ring 88 or the aperture 86 in the same manner as shown in FIG. 5 and described for loop 60.

In some embodiments, the loop 58 or loop 80 is provided separately from the bowl. Therefore the loop can be attached to preexisting bowls to convert such bowls into bowls capable of anchoring balloons. When the loop 58 is provided with a suction cup, the suction cup allows the loop to be removably attached to the bowl, other centerpieces, or any exterior surface.

Figure 8:
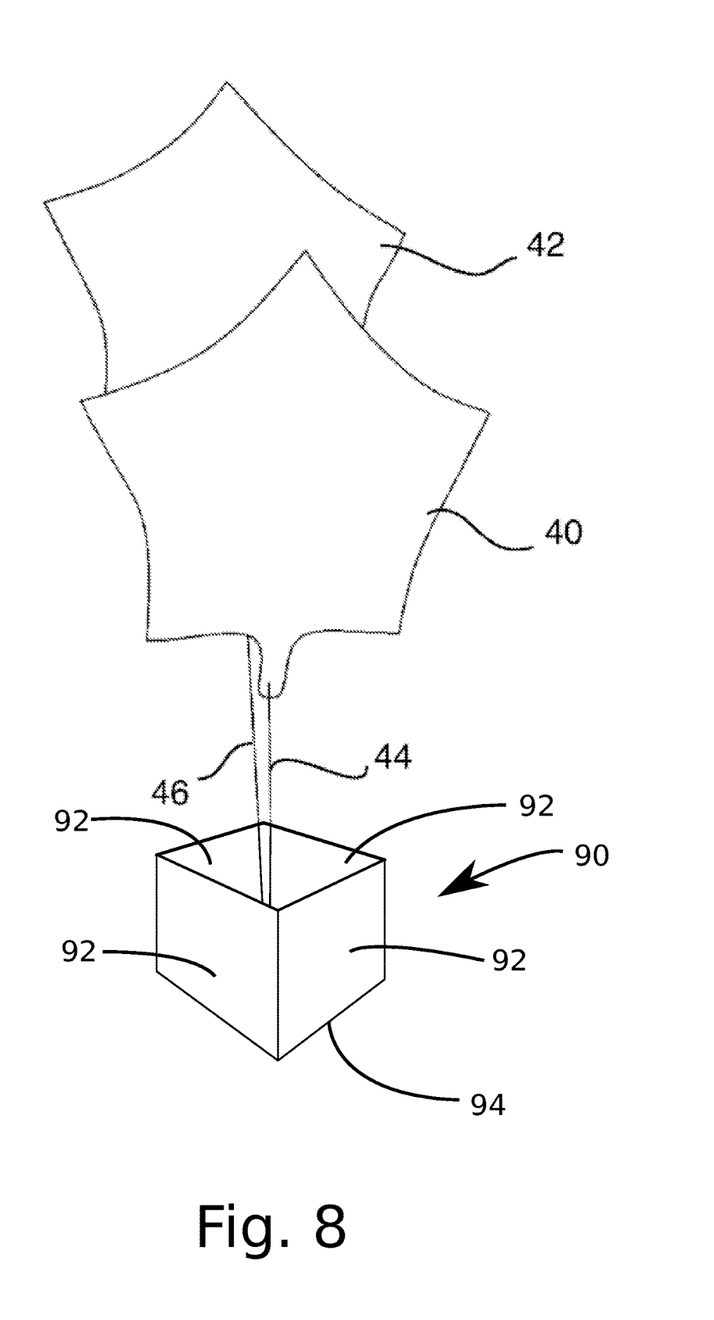
FIG. 8 is a perspective front view a second embodiment balloon anchor container of the invention connected to two balloons.

While a bowl with curved sides is provided other containers with an open top and a bottom surface can be used with the balloon anchor in place of the bowl. In some embodiments, a container 90 having the balloon anchor on a bottom 94 comprises multiple sidewalls 92 that forms a semi-enclosed space with an open top opposite a bottom 94, such as shown in FIG. 8. In some embodiments, the container is a square box, a rectangular box, triangular, irregular, or other shape. In some embodiments, the sidewall of the container may be provided with decorative designs as is shown in FIG. 2. The container may be provided in any size, shape, or color. In some embodiments, the sidewall(s) of container are straight. In some embodiments, the sidewalls of the container are perpendicular to the bottom wall.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A table top centerpiece for anchoring a balloon filled with a substance that is lighter than the surrounding air, comprising:
   a bottom wall;
   a curved sidewall extending from the bottom wall and surrounding the bottom wall to form a bowl having a semi-enclosed space with an open top opposite the bottom wall, the curved sidewall forming a rim opposite the bottom wall, the bowl provides a fill material receiving space for receiving decorative fill material below the rim;
   a balloon anchor member, the balloon anchor member comprises an anchor member height that is less than a sidewall height of the sidewall, the balloon anchor member forms a balloon string passage configured to allow a portion of a balloon string to pass through the balloon string passage and be secured about the balloon anchor member,
   the balloon anchor member extends from and above the bottom wall.

2. The centerpiece of claim 1, wherein the sidewall height is from two to twenty times the anchor member height.

3. The centerpiece of claim 1, wherein the anchor member is an arch attached to the bottom wall.

4. The centerpiece of claim 1, wherein the anchor member comprises a first end and an opposite second end, the first and second ends join with the bottom wall at spaced apart locations.

5. The centerpiece of claim 1, wherein the anchor member is a loop attached to the bottom wall.

6. The centerpiece of claim 1, wherein the anchor member is removably attached to the bottom wall.

7. The centerpiece of claim 1, wherein the anchor member is removably attached to the bottom wall with a suction cup.

8. The centerpiece of claim 1, wherein the anchor member comprises an adhesive that joins the anchor member to the bottom wall.

9. The centerpiece of claim 1, wherein the anchor member is an ellipse attached to the bottom wall.

10. The centerpiece of claim 1, wherein the bottom wall is flat and provides a lower surface for supporting the bowl on a table top surface.

11. The centerpiece of claim 1, wherein the bowl and the anchor member are transparent or translucent.

12. The centerpiece of claim 1, wherein the anchor member is located on the bottom wall centered in all directions from the sidewall.

13. A method of creating a decorative centerpiece for a table top, comprising the steps of:
   attaching a balloon string to a balloon anchor of a centerpiece by threading a first end portion of the string through an balloon string opening of the balloon anchor and attaching at least a portion of the first end portion of the balloon string to a second portion of the balloon string that was not put through the balloon string opening to form a loop around the balloon anchor with the balloon string, a second end portion of the balloon string is attached to a balloon filled with a substance that is lighter than the surrounding air, the balloon anchor is attached to an interior bottom wall of a centerpiece, the balloon anchor comprises a height that is less than a height of a sidewall of the centerpiece;
   filling the centerpiece with fill material at least until the balloon anchor is covered with fill material.

14. The method of claim 13, comprising the step of, before the step of attaching a first end portion of a balloon string, attaching the balloon anchor to an interior bottom wall of the centerpiece.

15. The method of claim 14, wherein the step of attaching a balloon anchor comprises the step of pressing an attachment side of a suction cup attached to the balloon anchor against the surface of the interior bottom wall of the centerpiece to removably attach the balloon anchor to the centerpiece.

16. The method of claim 13, wherein the step of filling is further defined in that the fill material is selected from the group consisting of: water, aggregate, sea shells, food, vegetation, live fish, paper, figures, figurines, ribbons, and candles.

17. A table top container for anchoring a balloon filled with a substance that is lighter than the surrounding air, comprising:
   a bottom wall;
   one or more sidewalls extending from the bottom wall and surrounding the bottom wall to form a container having a semi-enclosed space with an open top opposite the bottom wall, the sidewall forming a rim opposite the bottom wall, the container comprises a fill material receiving space for receiving decorative fill material below the rim;
   a balloon anchor member, the balloon anchor member forms a balloon attachment passage, the balloon anchor member has a height that is less than a height of the one or more sidewalls,
   the balloon anchor member extends from and above the bottom wall.

18. The container of claim 17, wherein
   a sidewall height of each of the one or more sidewalls is from two to twenty times a balloon anchor member height of the balloon anchor member;
   the anchor member is a loop joined to the bottom wall;
   the bottom wall is flat;
   the anchor member is located on the bottom wall centered in all directions from the one or more sidewalls.

* * * * *